(12) United States Patent
West et al.

(10) Patent No.: US 9,845,972 B2
(45) Date of Patent: Dec. 19, 2017

(54) TORQUE TUBE MOUNTED PHOTOVOLTAIC APPARATUS, SYSTEM, AND METHOD

(71) Applicant: SolarCity Corporation, San Mateo, CA (US)

(72) Inventors: Jack Raymond West, San Rafael, CA (US); Tyrus Hawkes Hudson, Petaluma, CA (US); David Molina, Oakland, CA (US); Brian Atchley, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/153,627

(22) Filed: May 12, 2016

(65) Prior Publication Data

US 2016/0261230 A1    Sep. 8, 2016

Related U.S. Application Data

(62) Division of application No. 14/190,997, filed on Feb. 26, 2014, now Pat. No. 9,347,691.

(Continued)

(51) Int. Cl.
*F24J 2/52* (2006.01)
*H01L 31/042* (2014.01)
(Continued)

(52) U.S. Cl.
CPC .......... *F24J 2/5207* (2013.01); *F24J 2/5232* (2013.01); *F24J 2/5245* (2013.01); *F24J 2/5247* (2013.01);
(Continued)

(58) Field of Classification Search
CPC ........ F24J 2/5247; F24J 2/5245; F24J 2/5252; F24J 2/5262; F24J 2/5254; F24J 2/5207;
(Continued)

(56) References Cited

U.S. PATENT DOCUMENTS 4,146,785 A    3/1979 Neale
4,189,881 A *  2/1980 Hawley ................... E04D 3/366
                                               136/244

(Continued)

FOREIGN PATENT DOCUMENTS

CH    WO 2004079775 A2 *  9/2004  ............... F24J 2/461
CN    WO 2010045129 A2 *  4/2010  ............. F24J 2/5205
(Continued)

OTHER PUBLICATIONS

Array Technologies, "DuraTrack HZ Solar Tracker", http://arraytechinc.com/utility/duratrack-hz-tracker/. pp. 1-2. Retrieved Mar. 20, 2014.

(Continued)

*Primary Examiner* — Eret McNichols
(74) *Attorney, Agent, or Firm* — Kilpatrick Townsend & Stockton LLP

(57) ABSTRACT

An interlocking system for connecting photovoltaic module frames to a torque tube, including: (a) an interlock dimensioned to be positioned between the sides of two adjacent photovoltaic module frames; (b) a pair of couplings or flanges, wherein the couplings or flanges connect the interlock to both of the adjacent photovoltaic module frames; and (c) a U-lock connected to the interlock, wherein the U-lock is dimensioned to be connected to a torque tube.

20 Claims, 28 Drawing Sheets

Related U.S. Application Data

(60) Provisional application No. 61/769,745, filed on Feb. 26, 2013.

(51) Int. Cl.

| | | |
|---|---|---|
| *H02S 20/00* | (2014.01) | |
| *H02S 30/10* | (2014.01) | |
| *H02S 20/23* | (2014.01) | |
| *H02S 20/30* | (2014.01) | |
| *H02S 20/32* | (2014.01) | |
| *F24J 2/46* | (2006.01) | |

(52) U.S. Cl.
CPC ........... *F24J 2/5252* (2013.01); *F24J 2/5254* (2013.01); *F24J 2/5262* (2013.01); *H01L 31/042* (2013.01); *H02S 20/00* (2013.01); *H02S 20/23* (2014.12); *H02S 20/30* (2014.12); *H02S 20/32* (2014.12); *H02S 30/10* (2014.12); *F24J 2002/467* (2013.01); *F24J 2002/4663* (2013.01); *F24J 2002/4665* (2013.01); *Y02B 10/12* (2013.01); *Y02E 10/47* (2013.01); *Y02E 10/50* (2013.01)

(58) Field of Classification Search
CPC ........... F24J 2002/4663; F24J 2002/467; F24J 2002/4665; H01L 31/042
See application file for complete search history.

(56) References Cited

U.S. PATENT DOCUMENTS

| | | | |
|---|---|---|---|
| 5,333,602 A | | 8/1994 | Huang |
| 6,058,930 A | | 5/2000 | Shingleton |
| 6,269,596 B1 * | | 8/2001 | Ohtsuka .................. E04D 3/366 126/621 |
| 6,722,357 B2 | | 4/2004 | Shingleton |
| D586,737 S | | 2/2009 | Shugar et al. |
| 7,554,030 B2 | | 6/2009 | Shingleton |
| 7,557,292 B2 | | 7/2009 | Shingleton et al. |
| 7,888,588 B2 | | 2/2011 | Shingleton |
| 8,101,849 B2 | | 1/2012 | Almy et al. |
| 8,230,850 B2 | | 7/2012 | Barsun et al. |
| 8,375,654 B1 | | 2/2013 | West et al. |
| 8,455,806 B2 | | 6/2013 | Judkins |
| 8,567,134 B1 * | | 10/2013 | Grushkowitz ......... F24J 2/5211 136/251 |
| 8,604,404 B1 | | 12/2013 | Linderman |
| 8,752,338 B2 * | | 6/2014 | Schaefer ................ F24J 2/5245 52/173.3 |
| 8,939,143 B2 * | | 1/2015 | Zuritis .................... F24J 2/5232 126/569 |
| 9,231,517 B2 * | | 1/2016 | West ...................... H01L 31/042 |
| 2003/0070368 A1 * | | 4/2003 | Shingleton ............. F24J 2/5205 52/173.3 |
| 2008/0053517 A1 * | | 3/2008 | Plaisted .................. F24J 2/5207 136/251 |
| 2008/0302407 A1 * | | 12/2008 | Kobayashi ............. F24J 2/5211 136/251 |
| 2008/0308091 A1 * | | 12/2008 | Corio ...................... H02S 20/32 126/606 |
| 2009/0025708 A1 | | 1/2009 | Shingleton |
| 2009/0032014 A1 | | 2/2009 | Meydbray |
| 2009/0188488 A1 | | 7/2009 | Kraft et al. |
| 2009/0250580 A1 * | | 10/2009 | Strizki ................... F24J 2/5207 248/309.1 |
| 2010/0089389 A1 * | | 4/2010 | Seery ...................... F24J 2/5232 126/608 |
| 2010/0139646 A1 | | 6/2010 | Barsun et al. |
| 2010/0276558 A1 * | | 11/2010 | Faust ...................... F24J 2/5205 248/222.14 |
| 2011/0000526 A1 * | | 1/2011 | West ...................... F24J 2/5211 136/251 |
| 2011/0041834 A1 | | 2/2011 | Liao |
| 2011/0073104 A1 * | | 3/2011 | Dopp ...................... F24J 2/055 126/651 |
| 2011/0114153 A1 | | 5/2011 | Almy et al. |
| 2011/0168232 A1 | | 7/2011 | Gibson et al. |
| 2011/0253190 A1 * | | 10/2011 | Farnham, Jr. .......... F24J 2/5254 136/244 |
| 2011/0265860 A1 * | | 11/2011 | Ciasulli .................. F24J 2/5252 136/251 |
| 2011/0265861 A1 * | | 11/2011 | Nabauer .................. E04C 3/07 136/251 |
| 2011/0303213 A1 | | 12/2011 | Kraft |
| 2012/0017526 A1 * | | 1/2012 | Eide ........................ H02S 20/30 52/173.3 |
| 2012/0073219 A1 * | | 3/2012 | Zuritis .................... F24J 2/5207 52/173.3 |
| 2012/0074079 A1 * | | 3/2012 | Marley .................. F24J 2/5232 211/41.1 |
| 2012/0090665 A1 * | | 4/2012 | Zuritis .................... F24J 2/5232 136/251 |
| 2012/0152326 A1 * | | 6/2012 | West ...................... F24J 2/5205 136/251 |
| 2012/0187058 A1 | | 7/2012 | Almy et al. |
| 2012/0216852 A1 | | 8/2012 | Almy et al. |
| 2012/0234378 A1 * | | 9/2012 | West ...................... F24J 2/5211 136/251 |
| 2012/0298817 A1 * | | 11/2012 | West ...................... F24J 2/5211 248/220.22 |
| 2013/0019921 A1 * | | 1/2013 | Au .......................... F24J 2/541 136/246 |
| 2013/0153007 A1 * | | 6/2013 | Plesniak ............. H01L 31/0422 136/251 |
| 2013/0265665 A1 * | | 10/2013 | Clavelle ................ G02B 5/10 359/853 |
| 2013/0340811 A1 * | | 12/2013 | Danning ................ H02S 20/23 136/251 |
| 2014/0026946 A1 * | | 1/2014 | West ...................... F24J 2/5205 136/251 |
| 2014/0069877 A1 * | | 3/2014 | McPheeters ............ F16B 2/065 211/26 |
| 2014/0130847 A1 * | | 5/2014 | West ...................... F24J 2/5211 136/251 |
| 2014/0158184 A1 * | | 6/2014 | West ...................... H02S 20/24 136/251 |
| 2014/0174511 A1 * | | 6/2014 | West ...................... H01L 31/18 136/251 |
| 2014/0246549 A1 * | | 9/2014 | West ...................... H02S 20/30 248/220.22 |
| 2014/0299179 A1 * | | 10/2014 | West ...................... H01L 31/042 136/251 |
| 2015/0040967 A1 * | | 2/2015 | West ...................... F24J 2/5247 136/251 |
| 2015/0075589 A1 * | | 3/2015 | West ...................... F24J 2/5233 136/251 |
| 2015/0244308 A1 * | | 8/2015 | Patton .................... F24J 2/5245 248/124.1 |

FOREIGN PATENT DOCUMENTS

| | | | | |
|---|---|---|---|---|
| DE | 102009019829 A1 * | 11/2010 | ............. | F24J 2/5232 |
| DE | 102010022845 A1 * | 12/2011 | ............. | F24J 2/5207 |
| DE | 202010008417 U1 * | 12/2011 | ............. | F24J 2/5209 |
| DE | EP 2503600 A2 * | 9/2012 | ............. | F24J 2/5252 |
| DE | 102012102234 A1 * | 9/2013 | ............. | F24J 2/4614 |
| EP | 2243901 A2 | 10/2010 | | |
| EP | 2503600 A2 | 9/2012 | | |
| FR | 2931932 A1 * | 12/2009 | ............. | F24J 2/4645 |
| FR | 2958378 A1 * | 10/2011 | ............. | F24J 2/045 |
| FR | 2974164 A1 * | 10/2012 | ............. | F24J 2/242 |
| IT | EP 2626651 A1 * | 8/2013 | ............. | F24J 2/5207 |
| JP | WO 2006109517 A1 * | 10/2006 | ............. | F24J 2/5207 |
| JP | WO 2008105296 A1 * | 9/2008 | ............. | F24J 2/5235 |
| JP | 4465406 B1 * | 5/2010 | ............. | F24J 2/5207 |
| WO | 2004079775 A2 | 9/2004 | | |
| WO | 2006109517 A1 | 10/2006 | | |
| WO | WO 2008108909 A1 * | 9/2008 | ............. | F24J 2/4614 |
| WO | 2010045129 A2 | 4/2010 | | |
| WO | 2011019460 A2 | 2/2011 | | |

(56) References Cited

FOREIGN PATENT DOCUMENTS

| WO | WO 2011019460 A2 * | 2/2011 | ............ F24J 2/5211 |
|----|---------------------|--------|--------------------------|
| WO | 2014018560 A1 | 1/2014 | |
| WO | WO 2014093258 A1 * | 6/2014 | ......... H01L 31/0522 |

OTHER PUBLICATIONS

Non-Final Office Action dated Jun. 18, 2015 in U.S. Appl. No. 14/190,997. 19 pages.

Final Office Action dated Aug. 31, 2015 in U.S. Appl. No. 14/190,997. 16 pages.

Notice of Allowance dated Jan. 21, 2016 in U.S. Appl. No. 14/190,997. 9 pages.

* cited by examiner

TORQUE TUBE MOUNTED PHOTOVOLTAIC APPARATUS, SYSTEM, AND METHOD

CROSS-REFERENCES TO RELATED APPLICATIONS

This application is a divisional application of U.S. patent application Ser. No. 14/190,997, filed on Feb. 26, 2014, which claims priority to U.S. Provisional Patent Application No. 61/769,745, filed on Feb. 26, 2013, which are herein incorporated by reference in their entirety for all purposes.

TECHNICAL FIELD

The present invention relates to mounting systems for photovoltaic (PV) modules.

BACKGROUND OF THE INVENTION

Various embodiments and variants of an attachment device for photovoltaic (PV) module connection to other PV modules and/or associated devices has been disclosed and shown in U.S. Provisional Patent Applications: 61/656,230 entitled: "Flashing Apparatus, System and Method", filed Jun. 6, 2012; 61/656,240 entitled "Rail Mounted PV Apparatus, Method and System", filed Jun. 6, 2012; and 61/698,292 entitled "Module Attachment System & Module Support System" filed Sep. 7, 2012; as well as U.S. patent application Ser. No. 13/402,846 entitled: "Pivot-Fit Frame, System and Method for Photovoltaic Modules", filed Feb. 22, 2012; each of which is incorporated by reference herein in its entirety. Other ancillary embodiments, including otherwise related or associated apparatus(es), system(s) and method(s) regarding embodiments of an interlock and other components have similarly been disclosed by applications of at least one of the named inventors hereto.

The above systems all provide effective PV attachment and mounting systems for mounting PV modules to levelling feet or rails positioned on building roofs.

However, what is now desired is a system that quickly and easily permits PV modules to be mounted onto torque tubes (which are tubes that rotate PV modules to track the motion of the sun, and thereby increase the electrical efficiency of the PV modules mounted thereon). As will be shown, the present system provides a fast, easy and convenient method of connecting a series of PV modules together on a rotatable torque tube.

Terms:

While various terms may have their ordinary meaning or particular meaning in the art, for ease of understanding there is provided herein, both below and at other locations in this specification, a non-limiting explanation as to the minimum scope intended for understanding of the present specification. Terms may be in singular or plural or any tense while retaining the same general meaning.

The term "arm" generally refers to a relatively narrow device, item, feature or portion of an item that extends, branches or juts-out from a mass or other part; also a slender part of a structure, machine, instrument or apparatus that projects from a main part, axis, pivot or fulcrum.

The term "bracket" generally refers to a simple structure with an elongate structure, sometimes in the general shape of an L or an I or a C, and frequently comprising a plate or sheet-type construction with one dimension typically thinner than the others in a given plate-like portion of the object. A bracket is often an overhanging member that projects from a structure (such as a portion of a wall or frame) and may be designed to support a load with a vertical component, such as a skirt or the like. A bracket may also refer to a fixture projecting from a wall, column, frame or the like which may be used for holding, securing, positioning or supporting another object. A bracket may also include an arm.

The term "connector" or "coupling" refers to an object, item, mechanism, apparatus, combination, feature, link or the like that links, joins, unites or fastens two or more things together.

The term "couple" refers to joining, linking, connecting or mating two or more objects or items, mechanisms, objects, things, structures or the like together and the term "coupling" refers to an object, item, mechanism, apparatus, combination, feature, link or the like that couples, joins, links, mates or connects two things together.

The term "engage" refers to contacting, interlocking or meshing one or more items, mechanisms, objects, things, structures or the like and "disengage" refers to detaching, freeing, loosening, extricating, separating or releasing from something that holds-fast, connects, couples or entangles.

The term "PV array" refers to a plurality of photovoltaic modules connected together often in a pattern of rows and columns with module sides placed close to or touching other modules. An example PV array is shown at array 1737 in FIG. 17, and its descriptions.

The term "PV module" refers to a photovoltaic module (sometimes referred to as a solar panel or photovoltaic panel), which is a packaged interconnected assembly of solar cells, also known as photovoltaic cells. A plurality of PV modules are commonly used to form a larger photovoltaic system referred to as a PV array, to provide electricity for commercial, industrial and residential applications. An example PV module is shown at module 1411 in FIG. 14, and its descriptions.

BRIEF SUMMARY OF THE INVENTION

An interlocking system for connecting photovoltaic module frames to a torque tube, including: (a) an interlock dimensioned to be positioned between the sides of two adjacent photovoltaic module frames; (b) a pair of couplings or flanges, wherein the couplings or flanges connect the interlock to both of the adjacent photovoltaic module frames; and (c) a U-lock connected to the interlock, wherein the U-lock is dimensioned to be connected to a torque tube.

In various embodiments, couplings or flanges (or both) may be used on the interlock to connect the interlock securely between two adjacent PV module frames which are mounted onto a torque tube to track the movement of the sun over the course of the day.

One advantage of the present system is that a single interlock can be used to support a pair of adjacent PV module frames. Specifically, the interlock may have a portion that is positioned under the side edges of two adjacent PV module frames. As such, one interlock can be used to support the side edges of two PV module frames.

Further advantages include reduced costs and labor (due to the small number of parts required). The present system is also auto-grounding between the adjacent PV modules.

In one aspect, a coupling passing through the interlock can be rotated into a locked position into the side groove in one module frame with the opposite side of the coupling then being received into the side groove of the second module frame. An advantage of this approach is that the second PV module frame can be easily rotated down into a locked position after the coupling has been rotated into a locked position in the side groove of the first PV module frame. Thus, successive PV modules can quickly and easily be added to the torque tube.

In another aspect, the interlock has a pair of support portions and a pair of flanges. The flanges are positioned within the side grooves in the adjacent PV module frames while the support portions are positioned under the side edges of the two adjacent PV module frames. In this aspect, an optional bracket clip can also be used to support one end of the interlock (with the flanges supporting an opposite end of the interlock).

An advantage of the system using either embodiment of the interlock is that the ends of the interlock need only extend to a mid-portion of the PV modules. This conserves materials as it is not necessary to mount the PV modules onto rails or any other support structure that extends the full length of the module. Rather, the present interlock only extends the distance (along the sides of the module) that is desired to advantageously reduce the cantilevered end portion of the module.

DETAILED DESCRIPTION OF THE INVENTION

Referring now to the figures, where like numerals generally refer to like parts, a first embodiment of the interlocking system is shown in FIGS. 1-13. A method of interlocking a plurality of PV module frames is shown in FIGS. 14-17, and a second embodiment of the interlocking system is shown in FIGS. 18-24.

Figure 1:
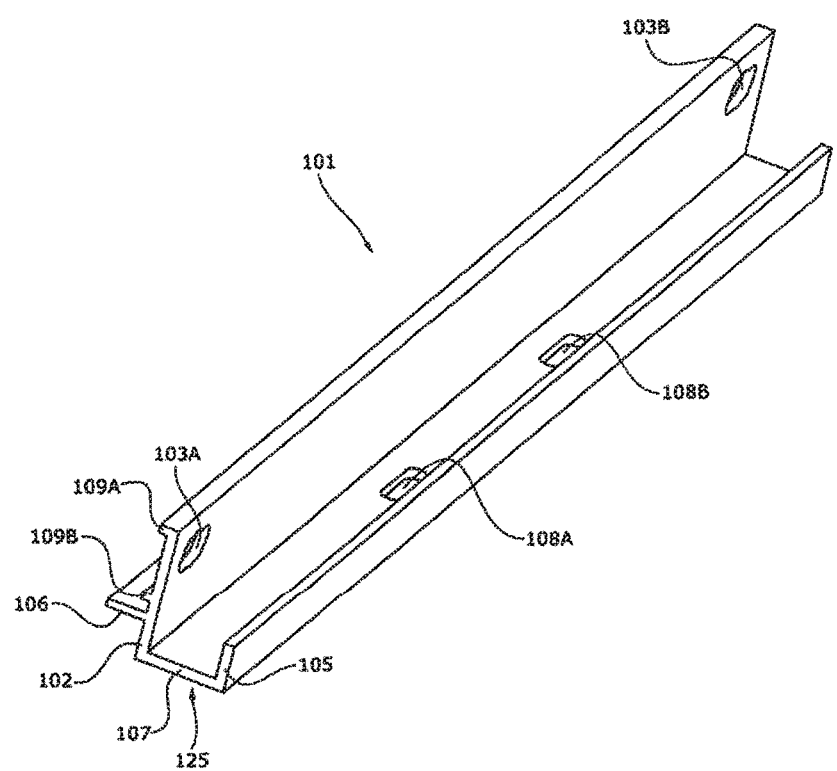
FIG. 1 is a perspective view of a first embodiment of the interlock.

Referring first to FIG. 1, an interlock is shown, such as interlock 101. FIGS. 1-17 show various embodiments and/or views of an interlock, such as interlock 101, both independently and in combination with other devices as further disclosed below. Interlock 101 may include a large, elongated first portion such as large vertical panel 102 with two or more apertures such as apertures 103a and 103b passing therethrough. In optional preferred aspects, apertures 103a and 103b are "Zep" apertures (having a proprietary shape as designed by Zep Solar of San Rafael, Calif.), as more fully described below. First portion 102 preferably also has two or more spacers such as spacer 109a and 109b extending therefrom. (In preferred aspects, spacer 109a is positioned at a top edge of first portion 102 and spacer 109b is positioned at a mid-section of first portion 102). A second portion 106 extends from first portion 102 extend from opposite top sides of the channel, as shown. As will be explained, second portion 106 will be positioned under a side edge of a photovoltaic module frame. The second portion 106 may or may not be load bearing, or it may be load bearing only at certain times. The present system encompasses both embodiments, which in turn depend upon both design tolerances and wind loading.

A third portion such as horizontal panel 125 extends from first portion 102. As can be seen, third portion 125 and second portion 106 preferably extends from opposite sides of first portion 102. Preferably, first portion 102 and fourth portion 105 are parallel to one another, and second portion 106 and third portion 125 are also parallel to one another. It is to be understood, however, that the present invention is not so limited, and that the attached claims also encompass alternate non-parallel embodiments. Similarly, first portion 102 and fourth portion 105 are preferably perpendicular to second portion 106 and third portion 125. It is to be understood, however, that the present invention is not so limited, and that the attached claims also encompass alternate non-perpendicular embodiments. In addition, fourth portion 105 may or may not be load bearing, or it may be load bearing only at certain times.

Second portion 106 extends from first portion 102. As can be seen, second portion 106 and spacers 109a and 109b extend in a first direction from first portion 102, whereas third portion 125 extends in a second (i.e.: opposite) direction from first portion 102.

In addition, fourth portion 105 extends from third portion 125. As illustrated, first portion 102 extends upwardly from one side of third portion 125 and fourth portion 105 extends upwardly from an opposite side of third portion 125.

In preferred aspects, the second and third portions are positioned at different heights with second portion 106 being an upper horizontal panel and third portion 125 being a lower horizontal panel.

Third portion 125 preferably has one or more apertures such as aperture 108a and 108b. Interlock 101 may be made of aluminum, another metal or alloy, plastic, composite, or other material(s) as known in the art.

Figure 2:
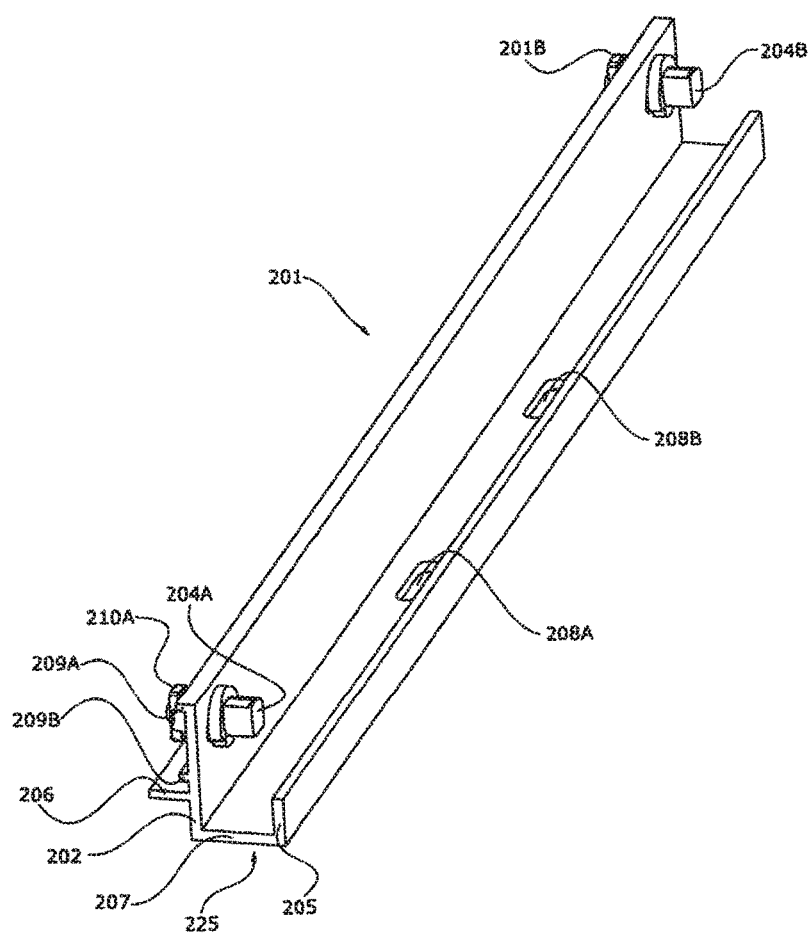
FIG. 2 is a view similar to FIG. 1, but with a pair of couplings positioned through apertures on a first planar portion of the device.

Referring now to FIG. 2, an interlock such as interlock 201 may include one or more (two shown) couplings 204A and 204B. Preferably, couplings 204A and 204B are "Zep" couplings. These couplings 204A and 204B may be installed, as by inserting or other manner, in apertures 103a and 103b as shown in FIGS. 1-3.

One preferred embodiment of couplings 204A and 204B may include, without limitation, any of the couplings shown and/or described in the following published US patent applications: Application 2012-0298188, Application 2010-0065108, Application 2012-0125410, and Application 2011-0000526, incorporated by reference herein, as well as others having at least one common inventor to the instant disclosure. Such a "Zep" style coupling may, without limitation, be inserted into a groove, slot, hole or other female structure (herinafter "groove") as shown and described in published US Patent Application 2011-0000526, as well as others having at least one common inventor to the instant disclosure and as discussed below. Preferably, coupling 204a or 204b may include a key portion such as key portion 210A or 210B that may secure an interlock to a groove, as further discussed and described below, and as seen in Zep-style couplings.

Figure 3:
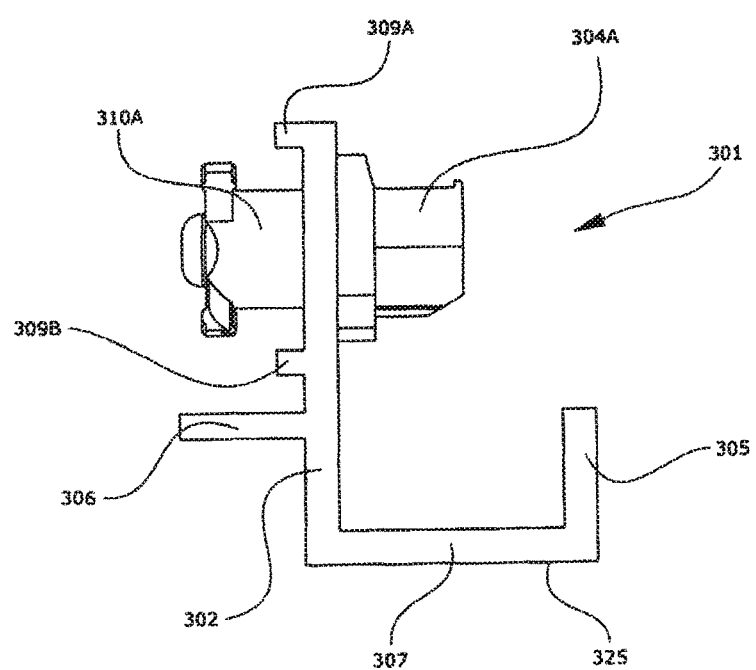
FIG. 3 is an elevation view taken at one end of the device seen in FIG. 2.
Figure 4:
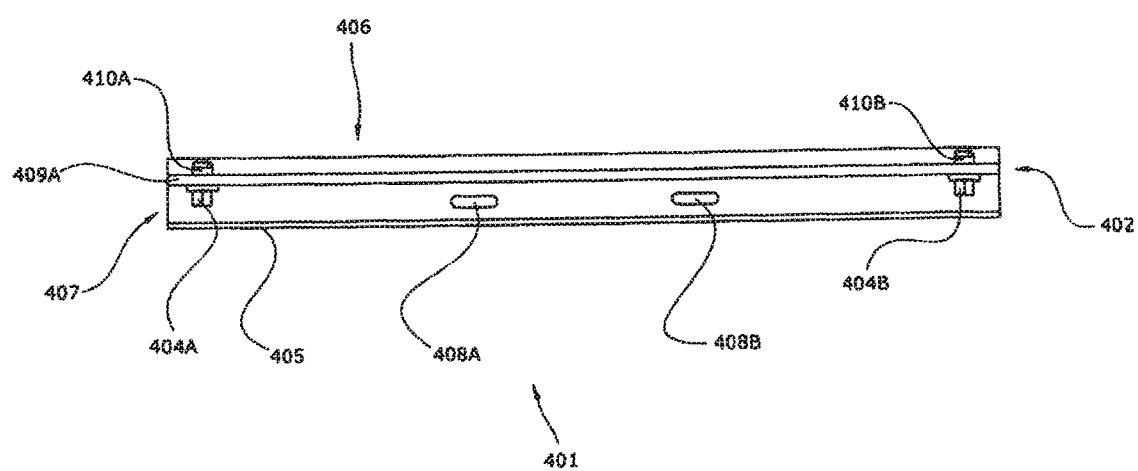
FIG. 4 is a top plan view corresponding to FIG. 2.

FIGS. 3 and 4 are respective end and top view of the system of FIG. 2.

Figure 5:
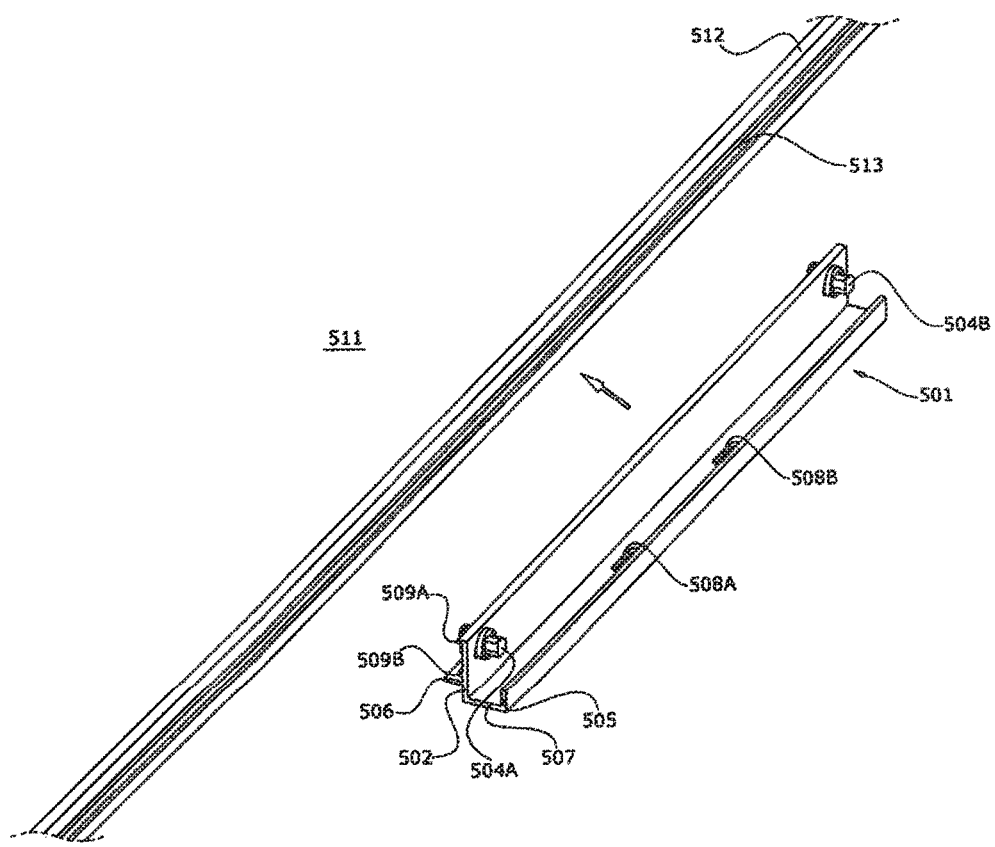
FIG. 5 is a view similar to FIG. 1, but showing one side of a photovoltaic module frame prior to attachment thereto.
Figure 13:
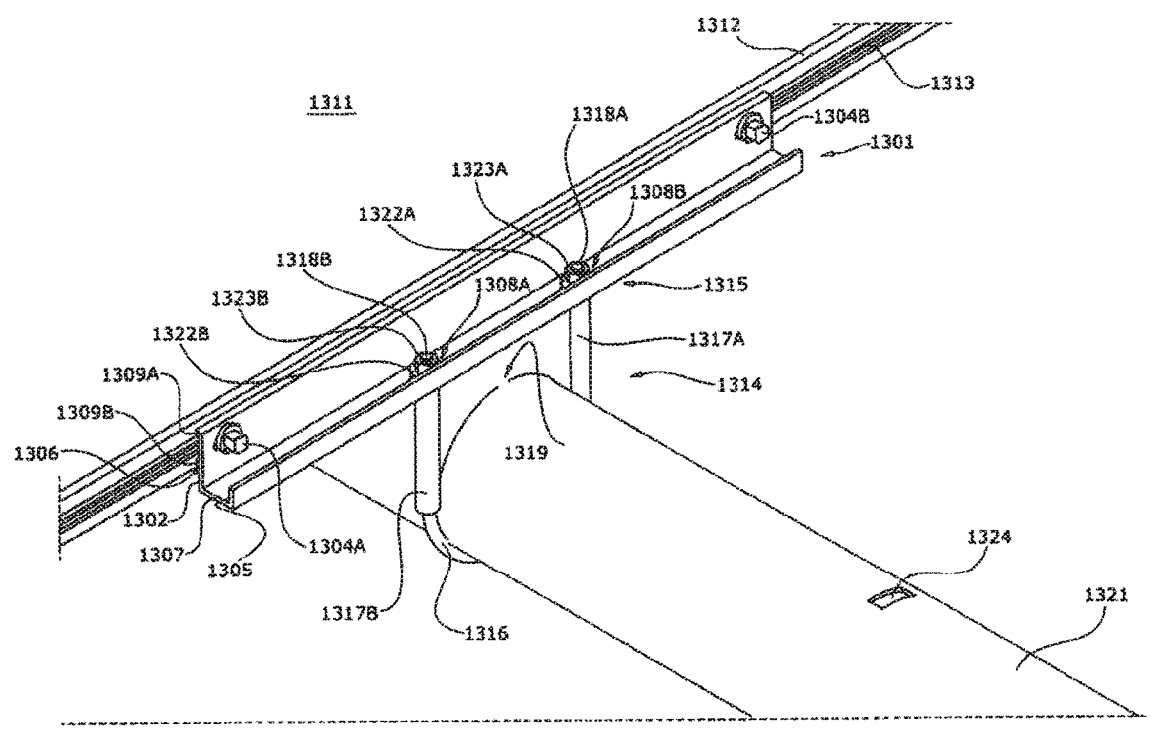
FIG. 13 is a perspective view of the device of FIG. 8, after attachment to the torque tube with the U-lock.

Referring next to FIG. 5, an interlock such as interlock 501 may connect to both a PV module such as PV Module 511 and a U-Lock 914 (seen in FIG. 9), such as described below, in order to connect the PV module 511 to form a PV array which may be installed on one or more torque tubes 1321 (as seen in FIG. 13), as described more fully below. As shown in FIGS. 5-8 and others, an interlock such as interlock 501 may be partially inserted into and may lock (or otherwise securely be positioned) into a groove or channel such as groove 513 located on the perimeter of a PV module frame such as module 511. Interlock 501 may, without limitation, (i) act as a connector between two PV modules, or between a PV module and one or more ancillary devices or structures, (ii) act as a coupling between two PV modules, or between a PV module and one or more ancillary devices or structures, or (iii) engage with a groove.

Figure 6:
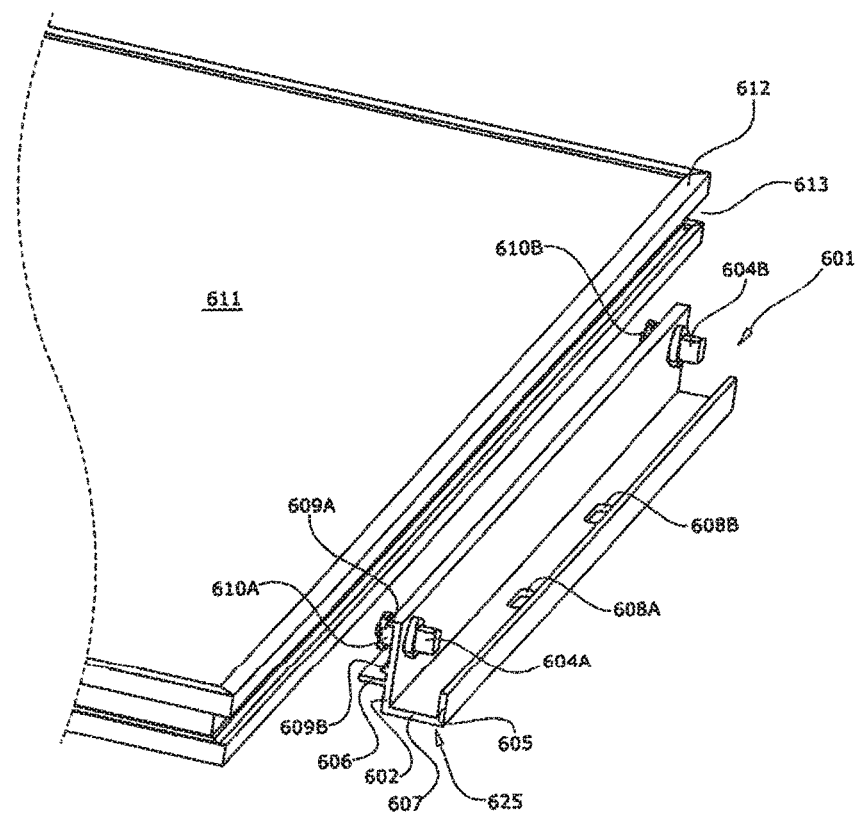
FIG. 6 is a perspective view similar to FIG. 5, but viewed from a different angle.
Figure 7:
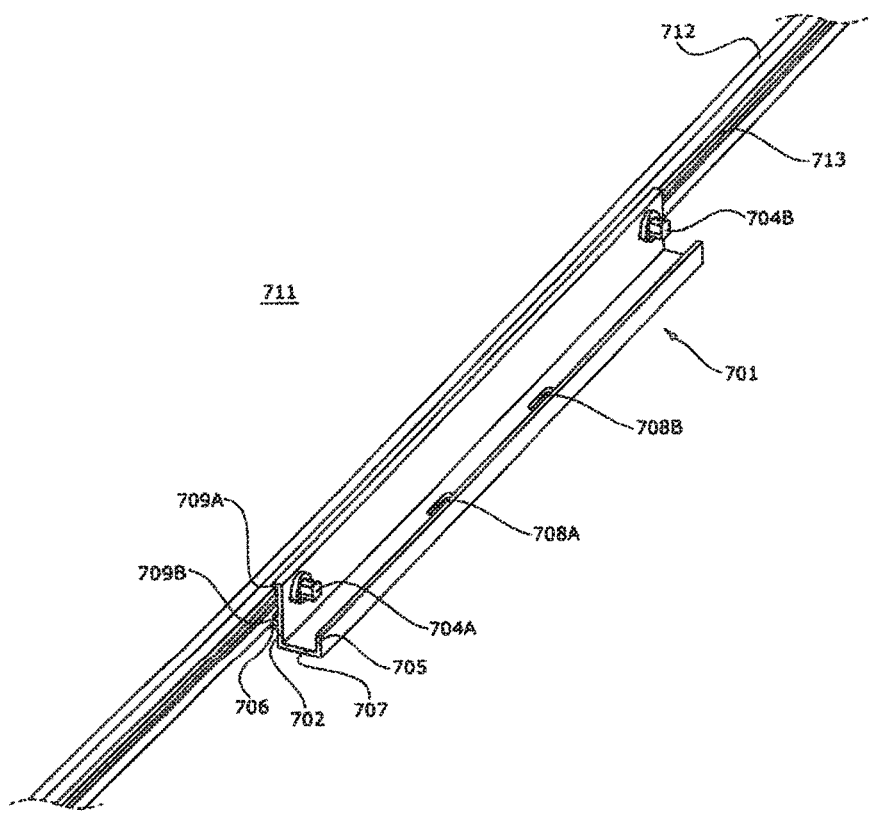
FIG. 7 is a view similar to FIG. 5, but showing the side of a photovoltaic module frame after the interlock has been inserted into position within a side groove of the frame.
Figure 8:
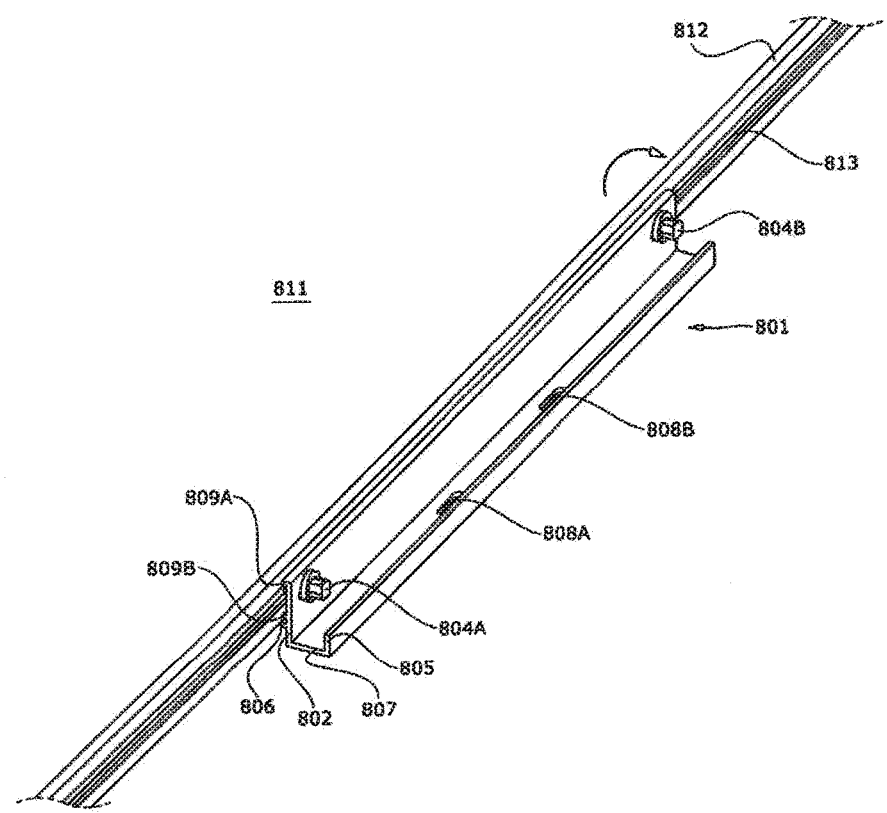
FIG. 8 is a view similar to FIG. 7, but showing the interlock in a locked position after the couplings have been rotated into a locked position.

Referring now to FIG. 6, interlock 601 may, by way of illustration and not limitation, connect to the groove 613 of the PV module 611 as follows, and as illustrated in FIGS. 5-8. First, interlock 601 is aligned such that couplings 604A and 604B are level with groove 613, with the key portions 610A and 610B of the couplings extending toward the groove 613. The key portions 610A and 610B of the couplings 604A and 604B then enter groove 613 until the spacers 609a and 609b contact the surface of the frame 612. Lastly, each coupling is turned clockwise to secure the interlock to the groove, as shown in FIGS. 7-8.

Referring now to FIG. 7, couplings 704A and 704B appear in the unlocked position. Referring now to FIG. 8, couplings 804A and 804B appear in the locked position, having turned to the right in the direction as indicated in the figure.

Figure 9:
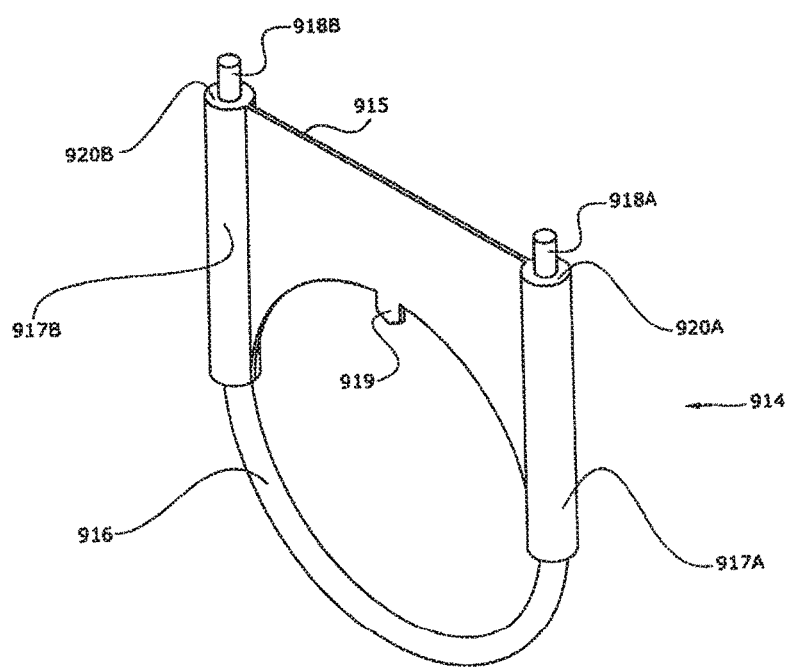
FIG. 9 is a perspective view of a U-lock.
Figure 10:
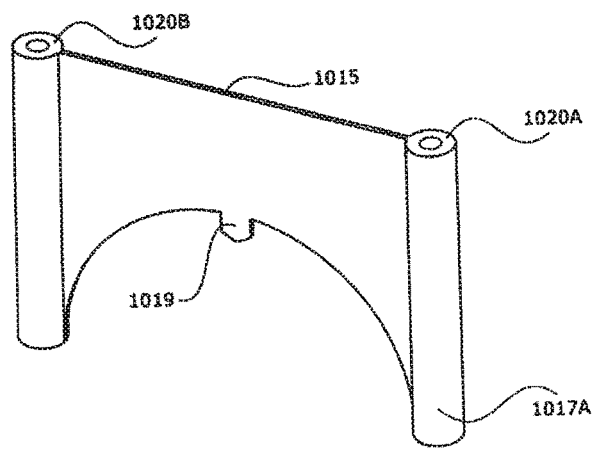
FIG. 10 is a perspective view of a first (i.e.: top) portion of the U-lock.
Figure 11:
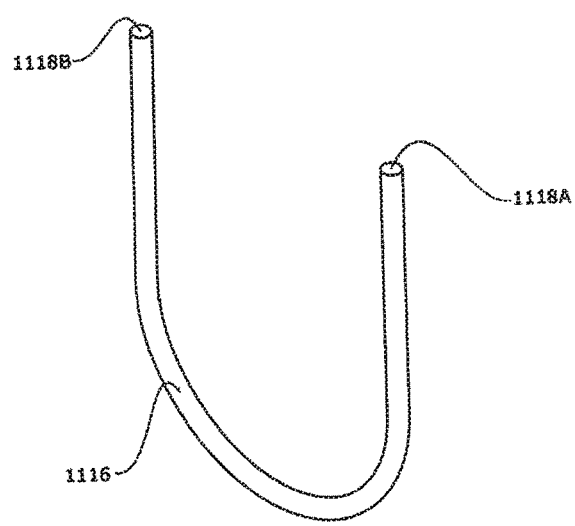
FIG. 11 is a perspective view of a second (i.e.: bottom) portion of the U-lock.

Referring to FIGS. 9-11, a U-Lock is shown, such as U-Lock 914, detailed below. U-lock 914 includes a first (i.e.: upper) portion 915, and a second (i.e.: lower) portion 916. The ends 918 of lower portion 916 are received through cylinders 917, projecting up through shoulders 920 of upper portion 915. A positioning tab 919 may also be included. U-portion 916 has two ends 918A and 918B that are threaded, in this embodiment, to receive a nut. U-Lock 914 may be made of aluminum, another metal or alloy, or other material as known in the art. Ends such as ends 918A and 918B may use connection methods other than threading for a bolt, such as friction, an adhesive, a spring clip or other methods as known in the art.

It is to be understood that the present system encompasses numerous U-lock embodiments, including any mounting hardware for connection to a torque tube. Torque tubes are circular, rectangular, etc. Thus, the present U-lock may be suited to encompass a cylindrical torque tube (as illustrated) or any other torque tube having any particular cross section.

Figure 12:
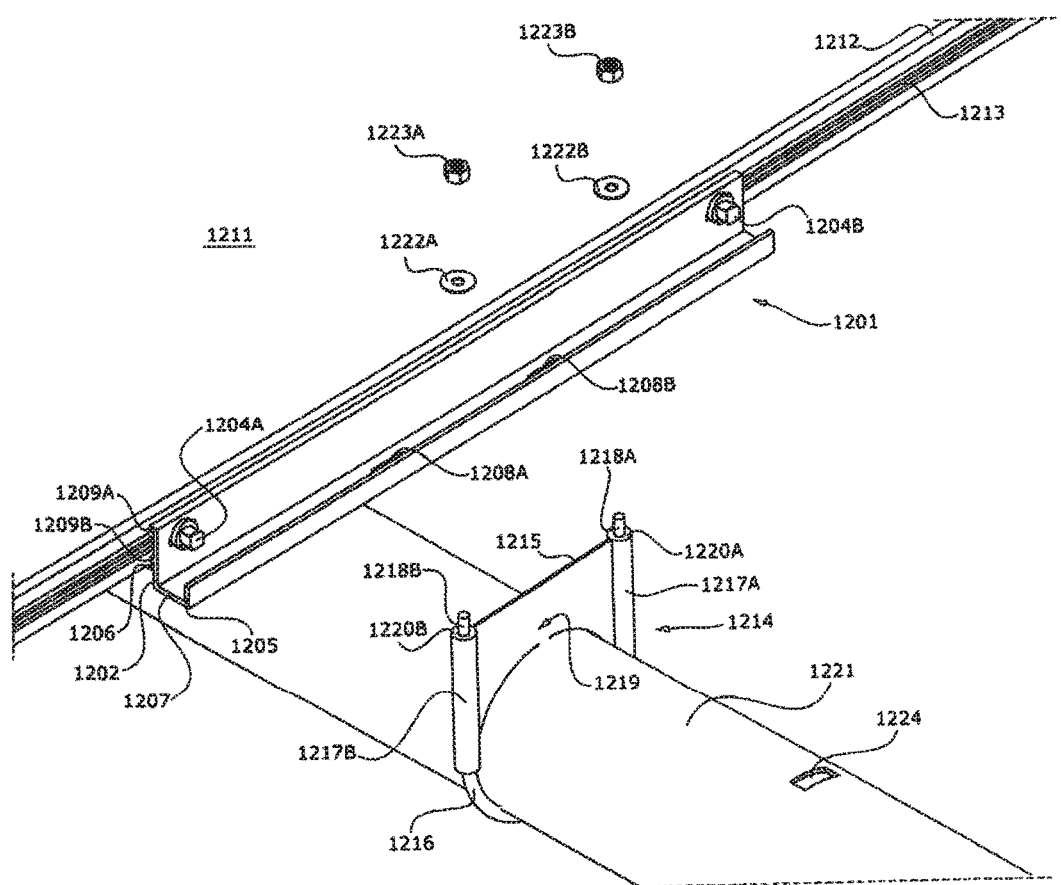
FIG. 12 is a perspective view of the device of FIG. 8, prior to the U-lock being attached to a torque tube.

Referring now to FIG. 12, and by way of illustration and not limitation, interlock such as interlock 1201 may connect to a U-Lock 1214 as follows. The top portion 1215 of the U-Lock 1214 is positioned beneath interlock 1201 such that the cylinders 1217A and 1217B are oriented vertically directly beneath apertures 1208A and 1208B, and the interlock 1201 rests on the shoulders 1220a and 1220b of the cylinders 1217A and 1217B. The ends 1218A and 1218B of the U-portion 1216 then enter the bottom of the cylinders 1217A and 1217B, pass through those cylinders 1217A and 1217B, and pass through the apertures 1208A and 1208B. A washer such as washers 1222A and 1222B may then placed on each end of the U-portion 1216, and a nut such as nuts 1223A and 1223B may be secured to each end 1218A and 1218B. FIG. 12 shows a flat washer for illustrative purposes, but the washer may be split, springing, spherical, or another manner of washer, as may be known in the art. The washer may be metal, plastic, rubber, composite, or other material (s), as may be known in the art. Another PV module or an ancillary device or structure may, but need not, be connected to the opposite side of the interlock 1201 thereafter, as shown in FIGS. 14-17.

Referring now to FIG. 13, a U-Lock such as U-Lock 1314 is shown, which is similar to U-Lock 914. U-Lock 1314 may, without limitation, connect to interlock such as interlock 1301 as discussed above. A U-Lock such as U-Lock 1314 may further engage a torque tube such as torque tube 1321, which may, by way of example and not limitation, be embodied as a cylinder with a diameter slightly less than that of the ring formed by the U-Lock 1314. Such a torque tube may include, along its length, a row of slots such as slot 1324 of a size equal to or slightly larger than that of the tab 1319. Such slots may be pre-cut, formed on site, formed by tab 1319 piercing the torque tube, or otherwise formed as known in the art. Tab 1319 of an U-Lock 1314 may be inserted into an aperture in the torque tube, with the top portion 1315 of the U-Lock 1314 half encircling the torque tube. The U-portion 1316 of the U-Lock 1314 then connects to the top portion 1315 so the U-Lock 1314 fully encircles the torque tube 1321. The ends 1323A and 1323B of the U-portion 1314 then pass through the apertures 1308A and 1308B of the interlock 1301 to complete the connection to the torque tube 1321. Additional PV modules connect to the interlock as described herein. A torque tube may rotate axially a designated number of degrees in either direction. The connection of the U-Lock to the torque tube and PV modules (using an interlock or other method) rotates the PV modules with the torque tube to increase the exposure of the PV modules to sunlight.

Figure 14:
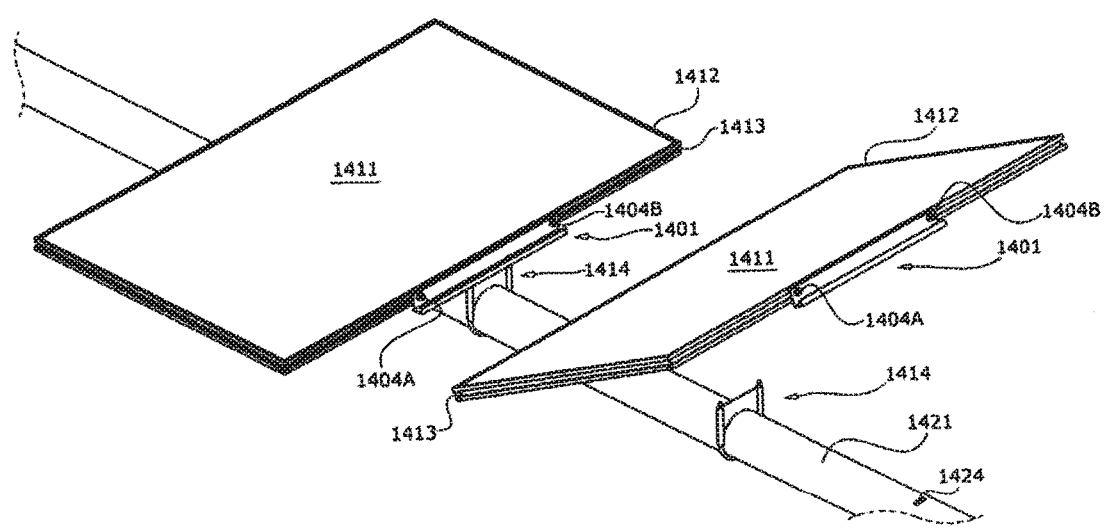
FIG. 14 is a perspective view of a first step of sequential panels being connected together on the torque tube.
Figure 15:
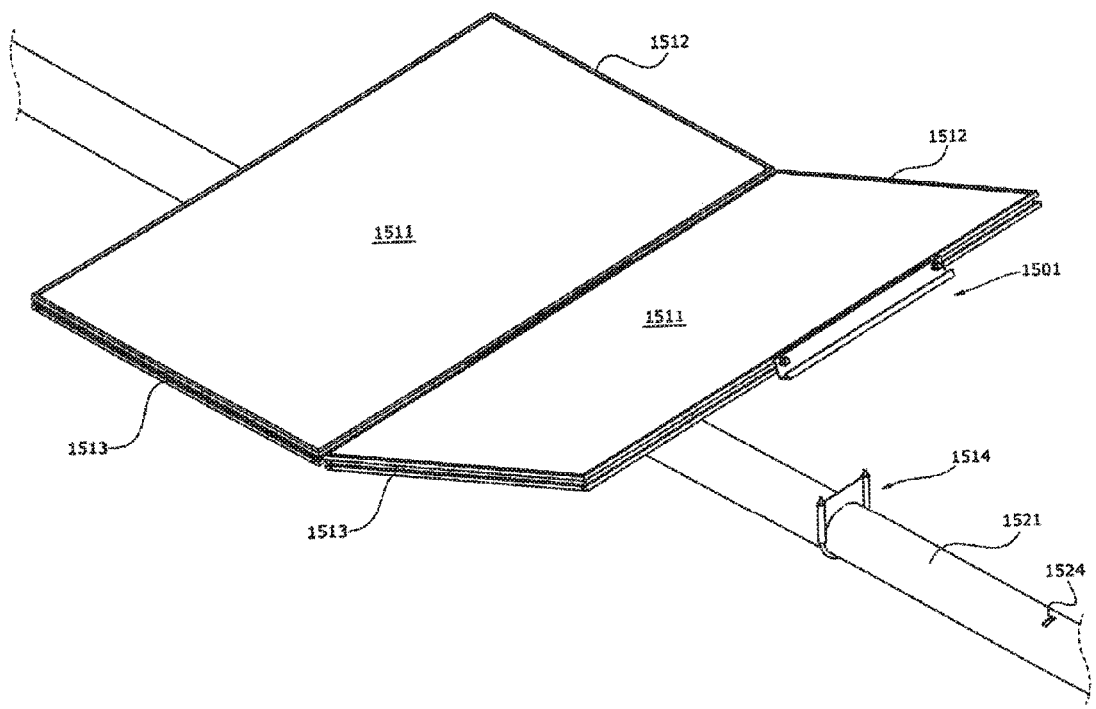
FIG. 15 is a perspective view of a second step of sequential panels being connected together on the torque tube.
Figure 16:
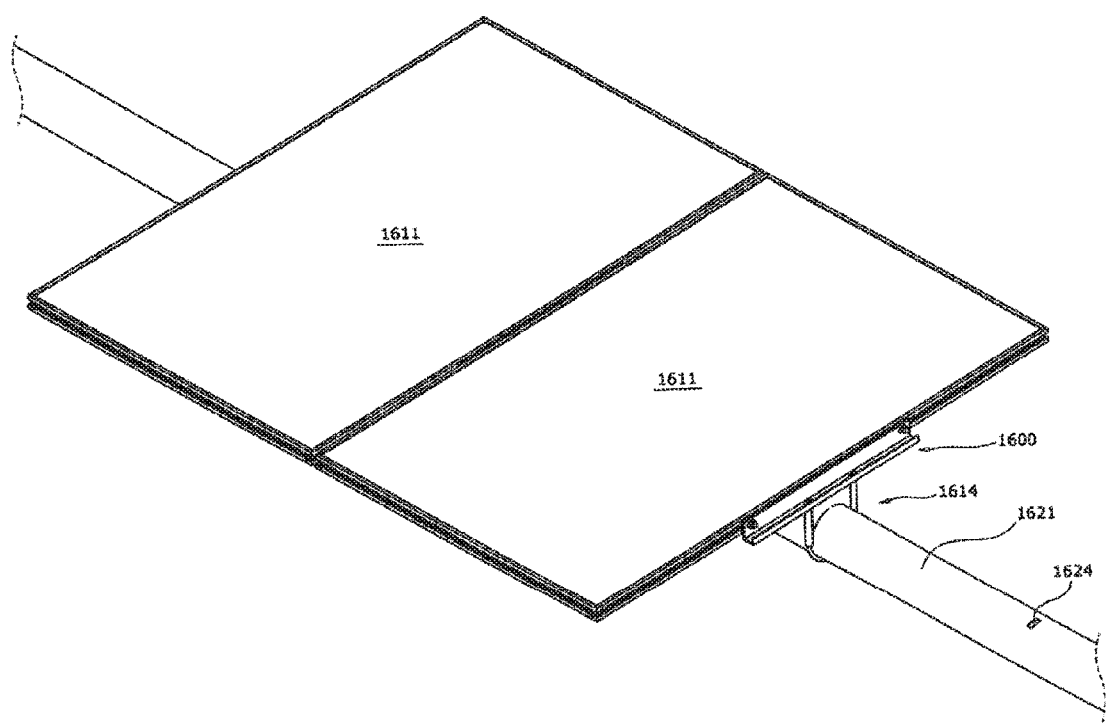
FIG. 16 is a perspective view of a third step of sequential panels being connected together on the torque tube.
Figure 17:
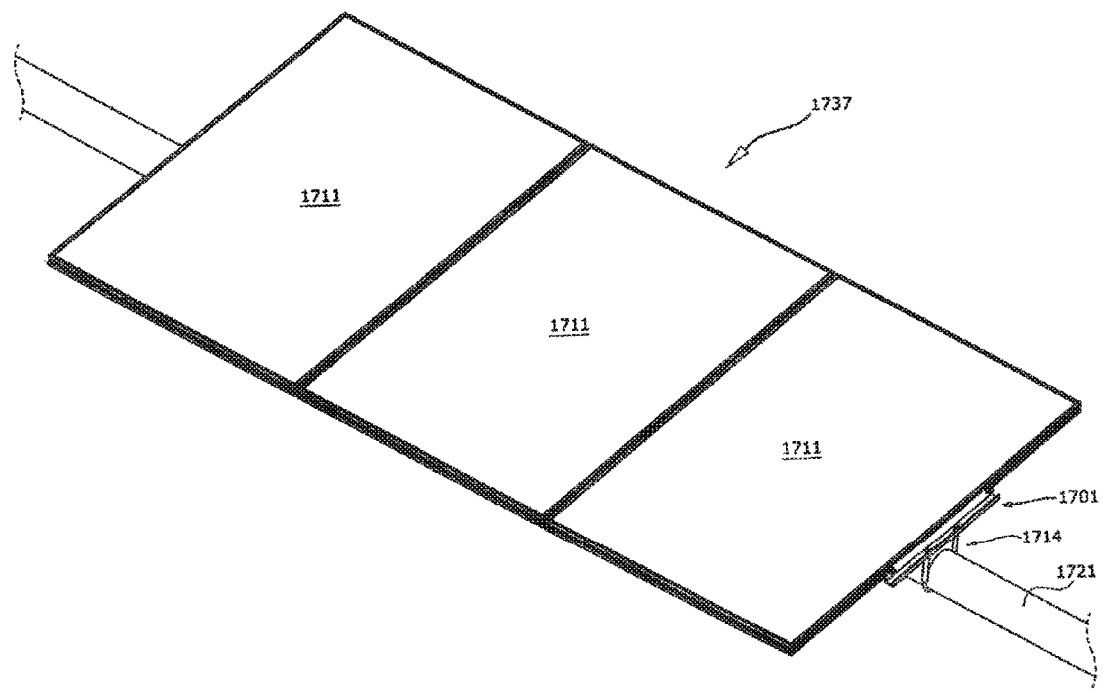
FIG. 17 shows three sequential panels connection together onto a torque tube.

FIGS. 14-16 illustrate successive method steps of sequential panels being connected together onto the torque tube. FIG. 17 shows three sequential panels connection together onto a torque tube. In FIG. 14, a first PV module frame (on the left) has been connected onto torque tube 1421 using the system described herein. Specifically, couplings 1404a and 1404b are rotated to lock interlock 1401 onto the right side of the first PV module frame. At this time, the key portion (310a in FIG. 3) is rotated into a locked position in the side groove of the first PV module. A second PV module frame (on the right) is about to be pivoted downwardly into position. Next, in FIG. 15, the left edge of the second PV module frame is placed on top of the second vertical panel (e.g. 305 in FIG. 3) of interlock 1401. At this time, the tongue portion (304a in FIG. 3) is ready to be received into the side groove of the second PV module. Next, in FIG. 16, the second PV module frame is pivoted downwardly into a locked position in alignment with the first PV module frame. At this time, the tongue portion (304a in FIG. 3) of the interlock is locked into the side groove of the second PV module (seen on the right).

As seen in FIG. 17, the process can be repeated such that additional PV module frames can be added. (FIG. 17 shows three PV module frames. It is to be understood that the present system is not so limited, and that any number of PV module frames can be added). As can be seen, an interlock such as interlock 1701 along with an U-Lock such as U-Lock 1714 may connect PV modules such as PV modules 1711 to a torque tube such as torque tube 1721, to permit the torque tube 1721 to rotate the connected PV modules 1711 to increase their exposure to the sun by following the path of the sun. Moreover, an advantage of the present system is that a single interlock can be connected to a PV module frame on either side.

Figure 18:
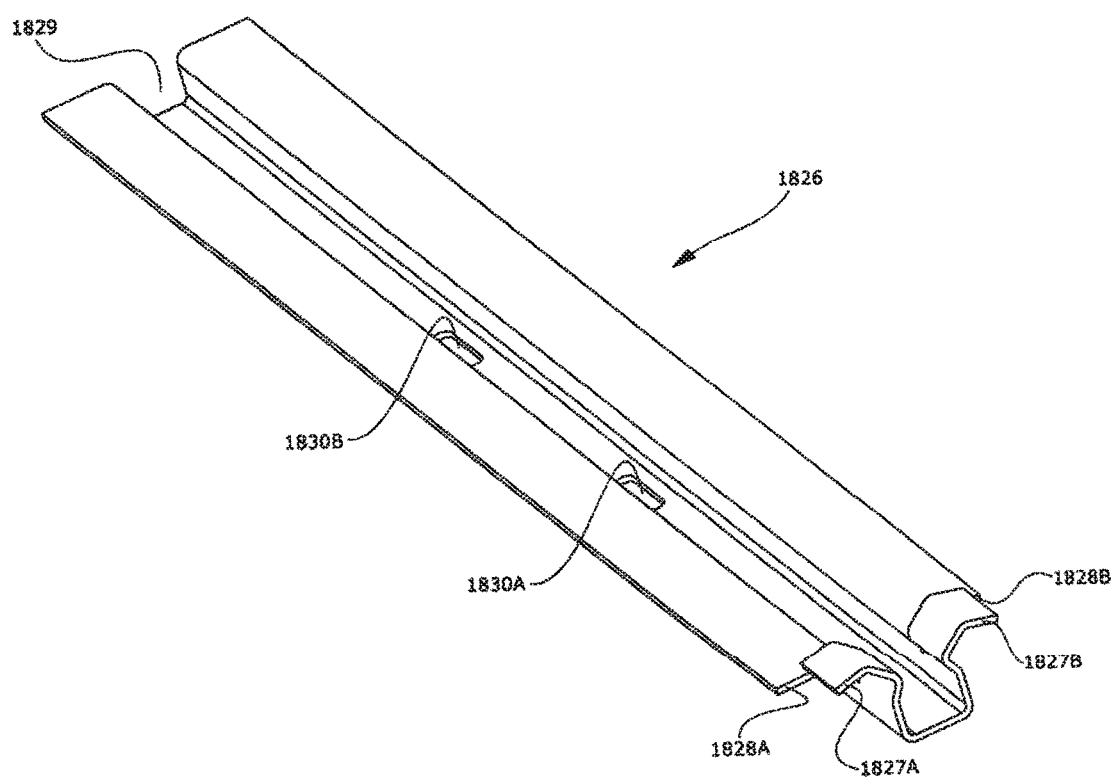
FIG. 18 is a perspective view of a second embodiment of the interlock.
Figure 19:
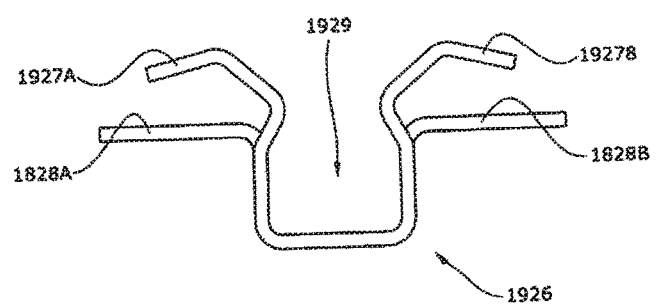
FIG. 19 is an elevation view taken at one end of the interlock seen in FIG. 18.
Figure 20:
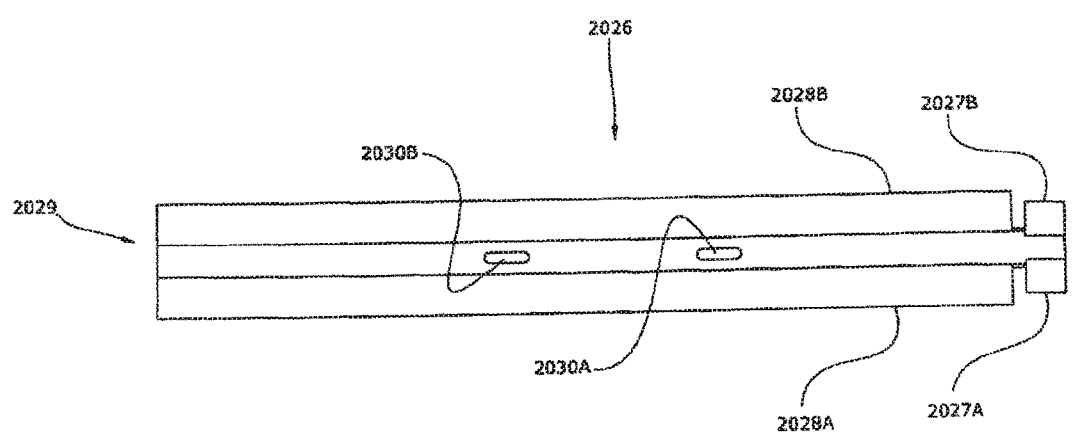
FIG. 20 is a top plan view corresponding to FIG. 18.

FIG. 18 shows another embodiment of an interlock, such as interlock 1826, which is similar to interlocks 101-1701, as shown in FIGS. 1-17 and others. Interlock 1826 may include two flanges 1827A and 1827B (at one end of the interlock as best seen in FIG. 20), and two support portions 1828A and 1828B (extending the remainder of the length of the interlock as also best seen in FIG. 20). Two or more apertures 1830a and 1830b pass through the center portion 1829 (best seen as channel 1929 in FIG. 19 and channel 2029 in FIG. 20). It is to be understood, however, that the center portion of the device need not be a channel. Instead, the present claims also encompass embodiments having alternate shapes and designs, including, but not limited to panels, blocks of material, etc.

Both flanges (labelled as 1827, 1927 and 2027) and support portions (labelled as 1828, 1928 and 2028) extend outwardly from horizontal channel center portion (1929). Preferably as well, flanges (1827, 1927 and 2027) and support portions (1828, 1928 and 2028) extend outwardly from opposite top sides of elongated horizontal channel (1929) as best seen in FIG. 19. Interlock 1826, 1926, 2026 may be made of aluminum, another metal or alloy, or other material as known in the art.

Figure 21:
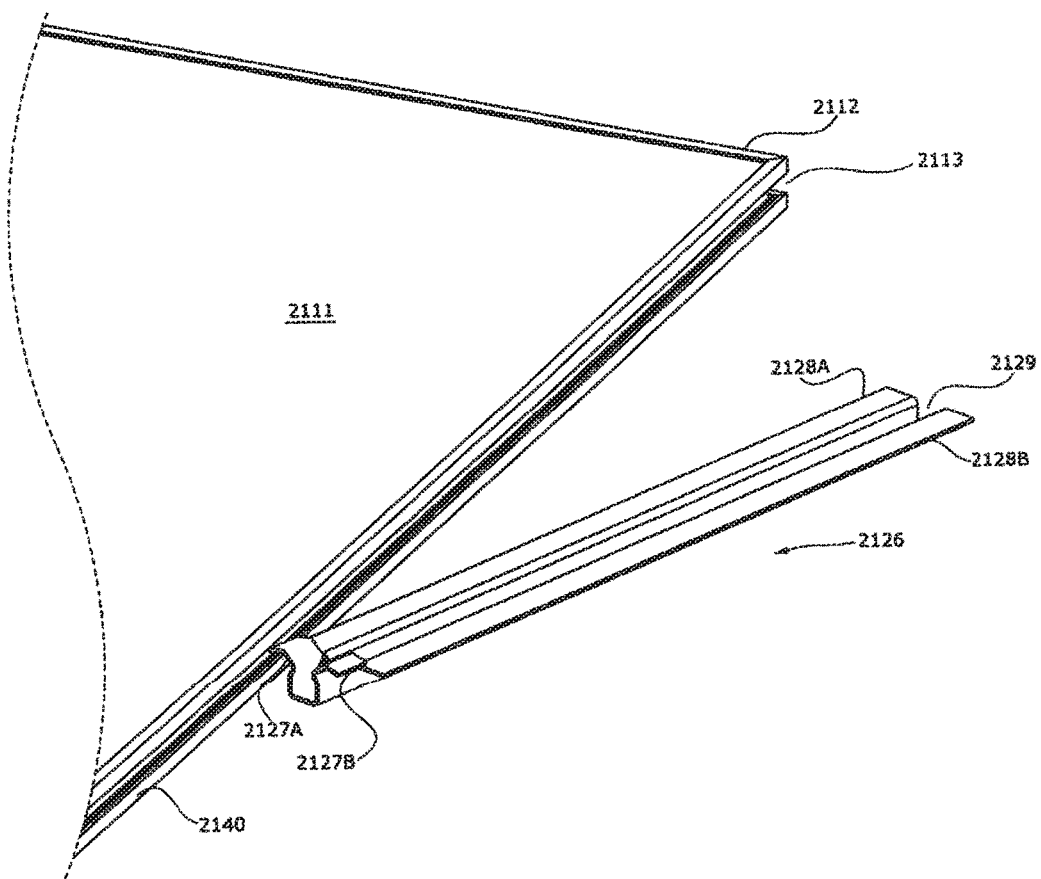
FIG. 21 is a view similar to FIG. 18, but showing the side of a photovoltaic module frame prior to attachment thereto.

Referring now to FIG. 21, and by way of illustration and not limitation, an interlock such as interlock 2126 may connect to the frame of a PV module such as PV module 2111 as follows. A flange such as flange 2127A or 2127B may enter the groove 2113, curving over the lower lip or edge 2140 of the groove. The interlock 2126 is then rotated downward such that the support portion 2128A or 2128B slides beneath the lower lip 2140 of the groove 2113 while the flange 2127A or 2127B continues to arc over the lower lip 2140 and into the groove 2113. The interlock 2126, frame 2112, or both may flex or otherwise deform while connecting. The connection is complete when the support portion 2128A or 2128B has slid beneath the lower lip 2140 such that the horizontal channel/center portion 2129 of the interlock is parallel to the groove 2113.

Figure 22:
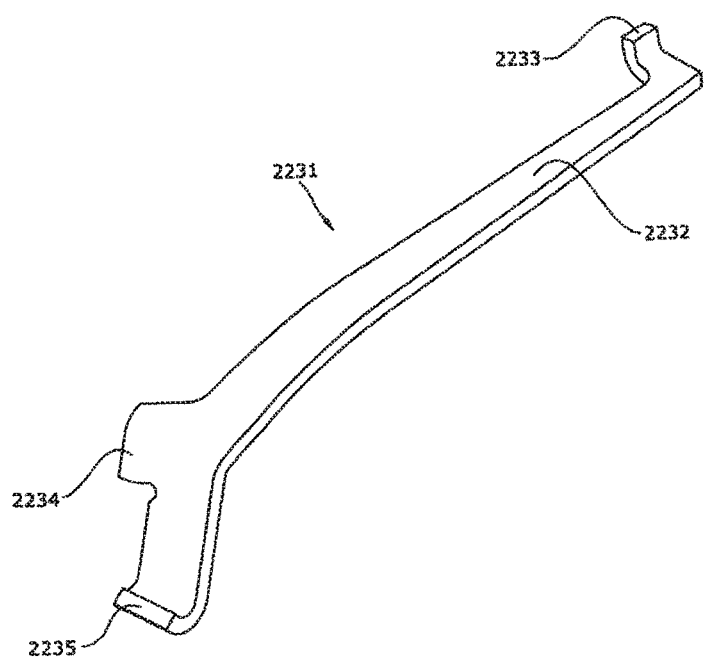
FIG. 22 is a perspective view of a first embodiment of a bracket clip for use with the second embodiment of the interlock as shown in FIGS. 18 to 23.

Referring now to FIG. 22, a bracket clip such as bracket clip 2231 is shown. Bracket clip 2231 may include an arm 2232 with a catch 2233, an upper tooth 2234 and a lower tooth 2235. Bracket clip 2231 may be made of aluminum, another metal or alloy, or other material as known in the art.

Figure 23:
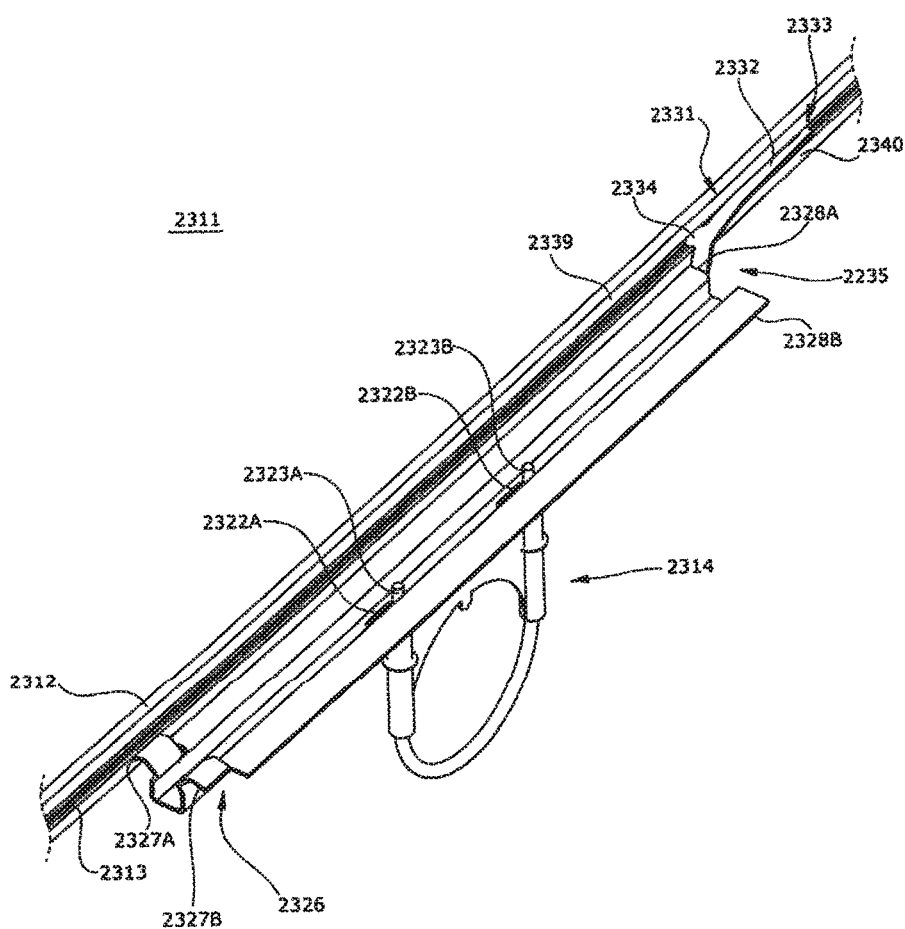
FIG. 23 is a perspective view of the second embodiment of the interlocking system after the interlock has been attached into a side groove of a photovoltaic module frame (showing a U-lock for attachment to a torque tube).

Referring now to FIG. 23, a U-Lock is shown such as U-Lock 2314, which is similar to U-Locks 914 and 1314. Without limitation, U-Lock 2314 may connect to an interlock such as interlock 2326 and ultimately to a torque tube as described above. As a result, the interlock such as interlock 2326 may connect a PV module such as PV module 2311 to a U-Lock such as U-Lock 2314 and then to a torque tube as discussed above.

Bracket clip 2331 may connect to an interlock 2326 and a PV module 2311 that are connected to one another as described above. By way of illustration and not limitation, bracket clip 2331 may connect as follows. First, the upper tooth 2334 is placed in the groove 2313 and then positioned as closely as possible to the end of the lower flange 2328A or 2328B. The lower tooth 2235 is then rotated under the lower flange 2328A or 2328B until the lower tooth 2235 contacts the underside of the lower flange 2328A or 2328B. Next, the arm 2332 may be pressed downward such that the arm 2332 flexes or otherwise temporarily deforms until the catch 2333 is level with the groove 2312. The catch 2333 is then moved into the groove 2312 until it clears the upper lip 2339 of the groove. Next, the arm 2332 is then released, causing it to "spring" upward, pressing the catch 2333 back up into the groove. The bracket clip 2331 thus "locks" the interlock 2326 to the frame 2312. The installed bracket clip 2331 prevents the lower flange 2328A or 2328B of the interlock 2326 from moving away from the frame 2312, so the interlock 2326 cannot disengage from the frame 2312. Thus, the bracket clip 2331 secures and maintains the connection of the interlock 2326 to the frame 2312. In other embodiments, the interlock may have an upper flange on each end and connect to the frame and groove of the module with or without a bracket clip. In still another embodiment, the interlock may have a series of upper flanges spaced along its length to connect to the frame and groove of the module with or without a bracket clip. By way of illustration and not limitation, an interlock such as interlock 2326 may connect to a U-Lock such as U-Lock 2314 in the same manner as interlock 1301 connects to U-Lock 1314.

Figure 24:
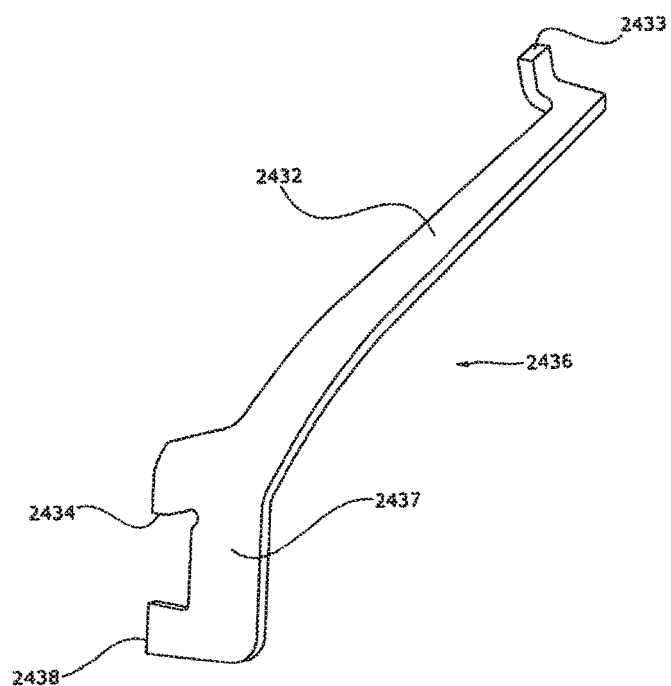
FIG. 24 is a perspective view of a second embodiment of a bracket clip for use with the second embodiment of the device shown in FIGS. 18 to 23.

Referring lastly to FIG. 24, which shows an alternate embodiment of a bracket clip, such as bracket clip 2436. Bracket clip 2436 is similar to bracket clip 2231 and 2331 discussed above and shown and described in FIGS. 21-22 and others. A bracket clip such as bracket clip 2436 may include an arm 2432 with a catch 2433, an upper tooth 2434, a lower tooth 2438, and a stopper 2437. A bracket clip such as bracket clip 2436 may be made of aluminum, another metal or alloy, or other material as known in the art.

In operation, a bracket clip 2436 may connect to a PV module such as PV module 2311 that is connected to an interlock such as interlock 2326. By way of illustration and not limitation, the bracket clip 2436 may connect to a groove such as groove 2313 by angling the upper tooth 2434 into the groove 2313 and then rotating the bracket clip 2436 downward such that the lower tooth 2438 slides beneath the lower lip 2340 of the groove 2313. Next, the arm 2432 may be pressed downward such that the arm 2432 flexes or otherwise temporarily deforms until the catch 2433 is level with the groove 2313. The catch 2433 is then moved into the groove 2313 until it clears the upper lip 2339. The arm 2432 is then released, causing it to "spring" up, pressing the catch 2433 securely into the groove.

Connecting the bracket clip 2436 to the groove 2313 prevents the bracket clip 2436 from moving laterally along or disengaging from the groove 2313. Bracket clip 2436 may therefore secure an interlock such as 2326 to a groove such as groove 2313. Where a bracket clip 2436 is installed in a frame connected to an interlock such that the stopper 2437 of the bracket clip 2436 contacts or nearly contacts the lower flange 2328A or 2328B of the interlock 2326, the bracket clip 2436 "locks" the interlock 2326 to the groove 2313. The installed bracket clip 2436 prevents the lower flange 2328A or 2328B from moving away from the groove 2313, so the interlock 2326 cannot disengage from the groove 2313.

Figure 25A:
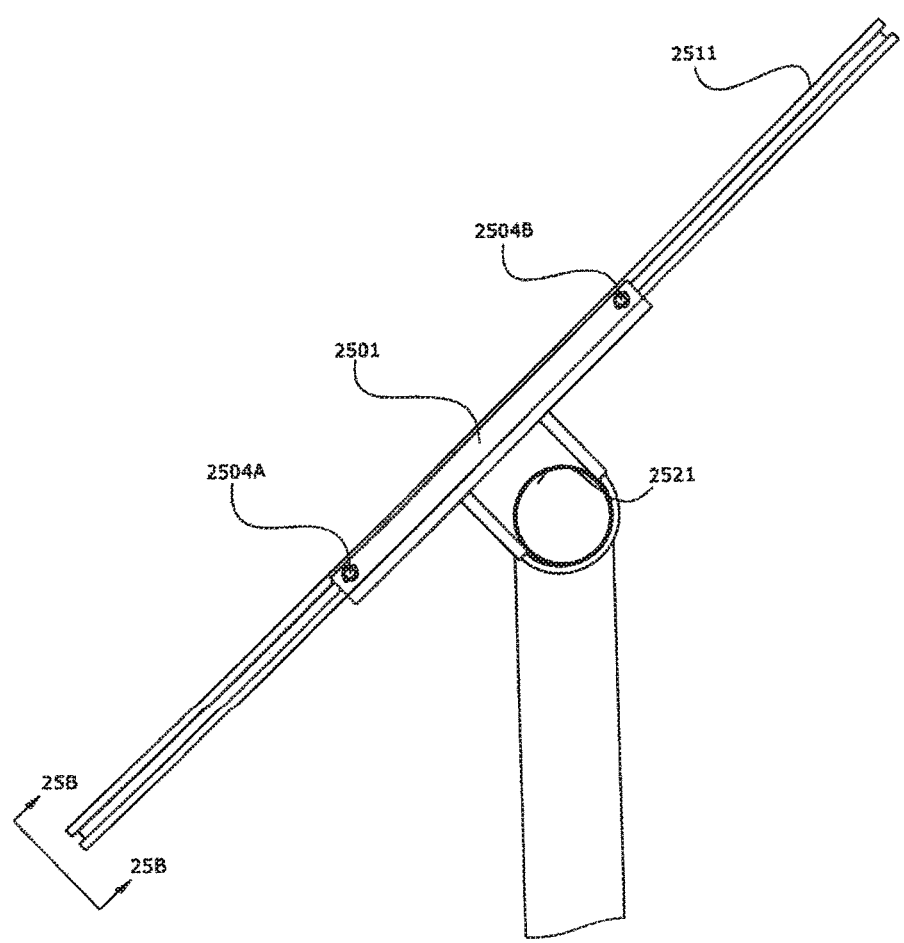
FIG. 25A is a side elevation view of the system in use, using the interlock of FIG. 1.
Figure 25B:
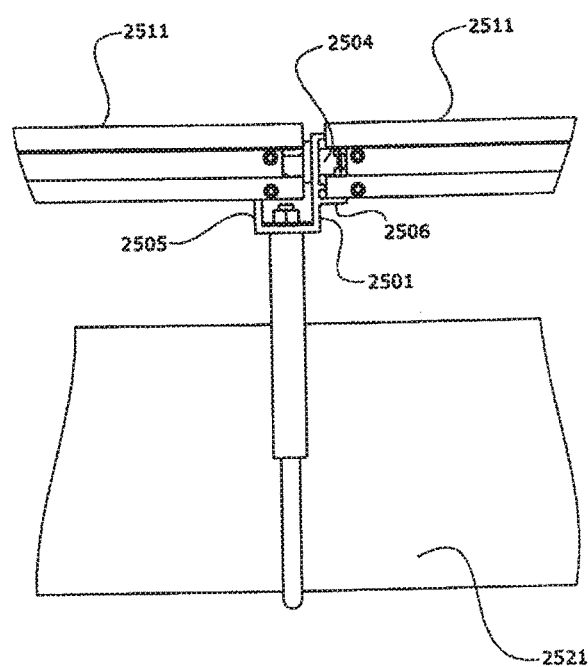
FIG. 25B is a view taken along line 25B-25B in FIG. 25A.
Figure 26A:
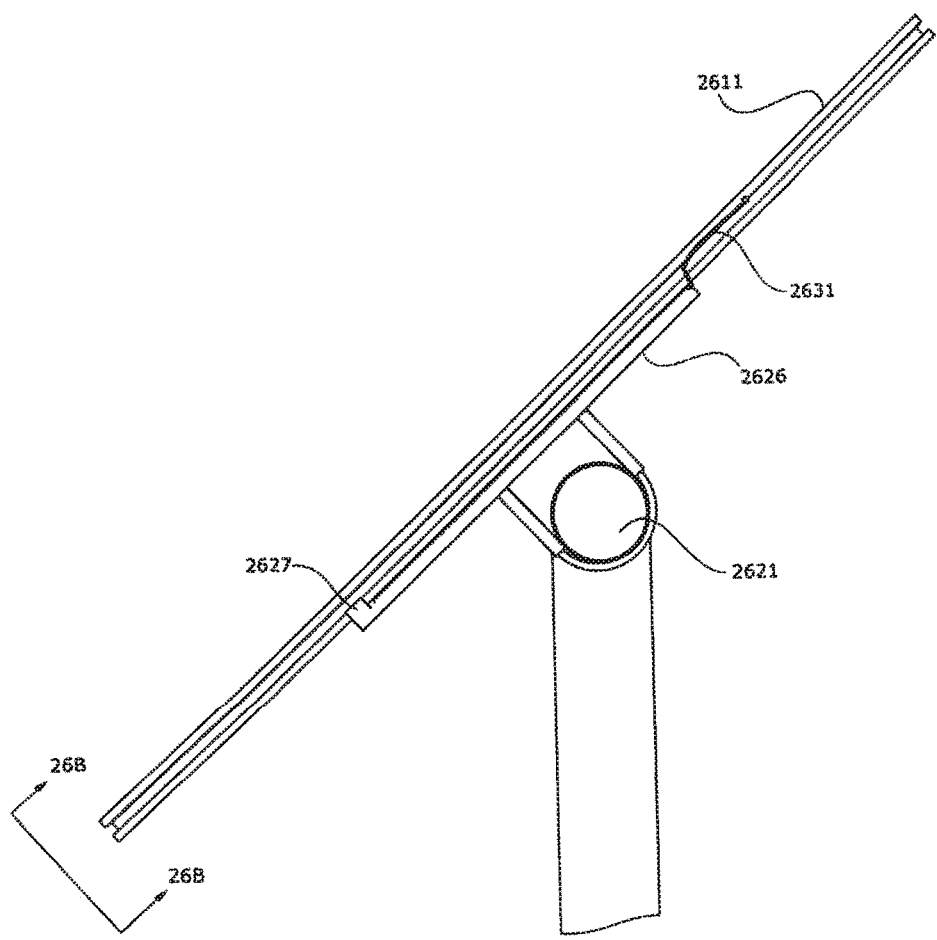
FIG. 26A is a side elevation view of the system in use, using the interlock of FIG. 18.
Figure 26B:
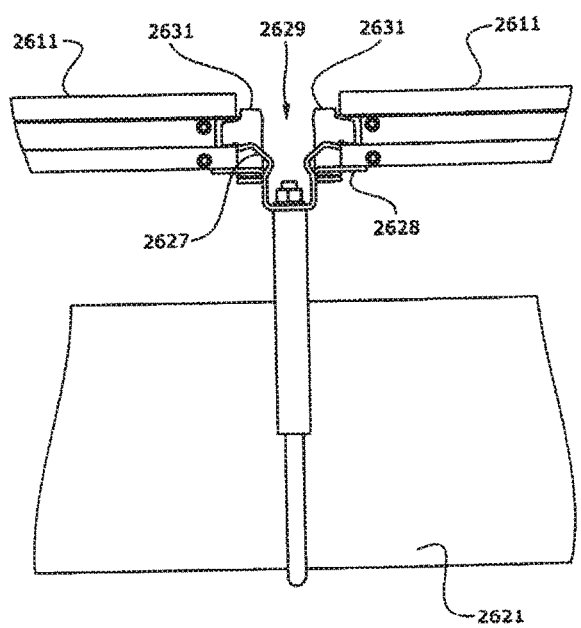
FIG. 26B is a view taken along line 26B-26B in FIG. 26A.

Lastly, FIG. 25A is a side elevation view of the system in use, using the interlock of FIG. 1; and FIG. 26A is a side elevation view of the system in use, using the interlock of FIG. 18. FIG. 25B and FIG. 26B are views taken along line 25B-25B and 26B-26B.

Specifically, in FIGS. 25A and 25B, interlock 2501 has couplings 2504 passing therethrough with the key portion 2510 locking into the side groove of one PV module and the tongue portion 2504 locking into the side groove of the second PV module. Similarly, in FIGS. 26A and 26B, interlock 2601 has flanges 2627 received into the side grooves of the module with support portions 2628 received under the side edges of the adjacent PV modules. As can be seen in both FIGS. 25 and 26, an advantage of the present system is that the interlocks do not extend along the full side length of the PV modules. Rather, the ends of the interlock are attached to the PV modules at a distance mid-way along the sides and the PV module frames to the torque tube. This provides a balance between material conservation and reduction of the cantilevered portion of the PV module frames. By providing a supporting structure for mounting PV module frames onto a rotating torque tube, as illustrated, the present system permits larger, heavier module frames to be used, including, but not limited to, 72 cell PV module frames.

What is claimed is:

1. An interlocking system for connecting photovoltaic module frames to a torque tube, comprising:
    (a) an interlock dimensioned to be positioned between sides of two adjacent photovoltaic module frames, wherein the interlock has a pair of apertures passing therethrough;
    (b) a pair of couplings, each coupling passing through one of the apertures in the interlock, wherein each coupling is configured to secure the interlock to both of the adjacent photovoltaic module frames; and
    (c) a first spacer extending from a top edge of the interlock above the couplings; and
    (d) a U-lock connected to the interlock, wherein the U-lock is dimensioned to be connected to a torque tube that rotates to track the sun.

2. The interlocking system of claim 1, wherein the couplings are positioned at opposite ends of the interlock.

3. The interlocking system of claim 1, wherein a portion of the interlock is positioned under a side edge of each of the photovoltaic module frames.

4. The interlocking system of claim 1, wherein each coupling includes a key portion that is rotatable between a locked position and an unlocked position, wherein the key portion is receivable into a groove in a side of a first photovoltaic module frame of the adjacent photovoltaic module frames until the first spacer contacts a surface of the frame above the groove, and wherein the key portion is configured to secure the interlock to the first photovoltaic module frame in the locked position.

5. The interlocking system of claim 4, wherein each coupling includes a tongue portion opposite the key portion, and wherein the tongue portion is receivable into a groove in a side of a second photovoltaic module frame of the adjacent photovoltaic module frame.

6. The interlocking system of claim 1, wherein the interlock does not extend along an entire length of the sides of the adjacent photovoltaic module frames.

7. The interlocking system of claim 1, wherein a midline of the interlock is aligned with a midline of at least one of the photovoltaic module frames when the interlock is secured to the at least one of the photovoltaic module frames.

8. The interlocking system of claim 1, wherein the interlock comprises:
    a first portion having at least one aperture passing therethrough;
    wherein at least one of the couplings extends through the at least one aperture of the first portion from a first side to a second side of the interlock, wherein the at least one of the couplings is configured to secure the interlock to the adjacent photovoltaic module frames, and wherein the coupling is rotatable from an unlocked position to a locked position to secure a first photovoltaic module frame of the adjacent photovoltaic module frames to a first side of the coupling on the first side of the interlock;
    a second portion extending from the first portion;
    a third portion extending from the first portion, wherein the second and third portions extend from opposite first and second sides of the first portion; and wherein the third portion has at least one aperture passing therethrough; and
    a fourth portion extending from the third portion, wherein the fourth portion extends upward from the third portion, wherein the second side of the first portion, the third portion, and the fourth portion define a recess on the second side of the interlock configured to allow a second photovoltaic module frame of the adjacent photovoltaic module frames to pivot fit onto a second side of the coupling when the coupling is in the locked position.

9. The interlocking system of claim 8, wherein the U-lock comprises:
    a lower portion, wherein the lower portion comprises an end portion passing through the at least one aperture in the third portion of the interlock, and
    an upper portion connected to the lower portion of the U-lock.

10. The interlocking system of claim 8, wherein the first spacer is configured to contact a portion of one of the photovoltaic module frames when the coupling is in the locked position.

11. The interlocking system of claim 10, wherein a second spacer extends from a mid-section of the first portion.

12. The interlocking system of claim 8, wherein the first and second portions of the interlock are perpendicular to one another, the first and third portions of the interlock are perpendicular to one another, and the third and fourth portions of the interlock are perpendicular to one another.

13. The interlocking system of claim 8, wherein the second portion and third portion extend from different heights on the first portion, the third portion extending at a lower height on the first portion than the second portion.

14. An interlock for connecting adjacent photovoltaic module frames together, comprising:
- a first portion having at least one aperture passing therethrough;
- a rotatable coupling extending through the at least one aperture of the first portion from a first side to a second side of the interlock, wherein the coupling is configured to secure the interlock to both of the adjacent photovoltaic module frames, and wherein the rotatable coupling is rotatable from an unlocked position to a locked position to secure a first photovoltaic module frame of the adjacent photovoltaic module frames to a first side of the coupling on the first side of the interlock;
- a second portion extending from the first portion;
- a third portion extending from the first portion, wherein the second and third portions extend from opposite first and second sides of the first portion; and wherein the third portion has at least one aperture passing therethrough; and
- a fourth portion extending from the third portion, wherein the fourth portion extends upward from the third portion, wherein the second side of the first portion, the third portion, and the fourth portion define a recess on the second side of the interlock configured to allow a second photovoltaic module frame of the adjacent photovoltaic module frames to pivot fit onto a second side of the coupling when the coupling is in the locked position.

15. The interlock of claim 14, wherein the first, second, third and fourth portions are essentially planar.

16. The interlock of claim 14, wherein the second and third portions are substantially parallel to one another, and the first and fourth portions are substantially parallel to one another, and wherein the fourth portion is configured to contact at least a portion of the second photovoltaic module frame of the adjacent photovoltaic module frames when the second photovoltaic module frame is secured to the second side of the coupling.

17. The interlock of claim 14, further comprising:
- a pair of spacers extending from the first portion of the interlock, wherein the pair of spacers are configured to contact a portion of a photovoltaic module frame when the interlock is secured to the photovoltaic module frame.

18. The interlock of claim 17, wherein a first of spacer extends from a top edge of the first portion above the rotatable coupling and a second spacer extends from a mid-section of the first portion.

19. The interlock of claim 14, wherein the first and second portions are perpendicular to one another, the first and third portions are perpendicular to one another, and the third and fourth portions are perpendicular to one another.

20. The interlock of claim 14, wherein the second portion and third portion extend from different heights on the first portion, the third portion extending at a lower height on the first portion than the second portion.

* * * * *